(12) United States Patent
Hermans

(10) Patent No.: US 11,857,917 B2
(45) Date of Patent: Jan. 2, 2024

(54) METHOD FOR DRYING COMPRESSED GAS

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 17/788,332

(22) PCT Filed: Dec. 28, 2020

(86) PCT No.: PCT/IB2020/062471
§ 371 (c)(1),
(2) Date: Jun. 23, 2022

(87) PCT Pub. No.: WO2021/137127
PCT Pub. Date: Jul. 8, 2021

(65) Prior Publication Data
US 2023/0013311 A1 Jan. 19, 2023

(30) Foreign Application Priority Data
Jan. 2, 2020 (BE) .................................. 2020/5000

(51) Int. Cl.
*B01D 53/02* (2006.01)
*B01D 53/26* (2006.01)
*B01D 53/04* (2006.01)

(52) U.S. Cl.
CPC ....... *B01D 53/261* (2013.01); *B01D 53/0454* (2013.01); *B01D 2259/402* (2013.01)

(58) Field of Classification Search
CPC .............. B01D 53/261; B01D 53/0454; B01D 2259/402
See application file for complete search history.

(56) References Cited

U.S. PATENT DOCUMENTS

| | | | | |
|---|---|---|---|---|
| 4,197,095 A | * | 4/1980 | White, Jr. ............ | B01D 53/261 95/122 |
| 4,247,311 A | | 1/1981 | Seibert et al. | |
| 4,322,223 A | * | 3/1982 | Christel, Jr. ......... | B01D 53/261 95/122 |
| 4,718,020 A | * | 1/1988 | Duich ................ | B01D 53/0454 95/126 |
| 4,941,894 A | * | 7/1990 | Black ................... | B01D 53/261 95/122 |

(Continued)

FOREIGN PATENT DOCUMENTS

| | | |
|---|---|---|
| EP | 0123061 A1 | 10/1984 |
| JP | 55-59824 B2 | 7/2014 |

(Continued)

OTHER PUBLICATIONS

International Search Report in corresponding PCT Application No. PCT/IB2020/062471, dated Apr. 16, 2021.

(Continued)

*Primary Examiner* — Christopher P Jones
(74) *Attorney, Agent, or Firm* — Bacon & Thomas, PLLC

(57) ABSTRACT

Method for drying compressed gas by means of a drying device with an inlet for the compressed gas to be dried and an outlet for the dried compressed gas. The drying device includes at least two vessels filled with a regenerable desiccant and an adjustable valve system including a first valve block and a second valve block that connects the inlet, respectively outlet, to the vessels. The adjustable valve system is being regulated as such that at least one vessel will dry compressed gas, while the other vessel will be regenerated and cooled successively, wherein by regulation of the valve system the vessels will each in turn dry compressed gas. The method includes calculating the time period ($t_{ads}$) during which a vessel (2) dries compressed gas, calculated on the basis of a ($t_{ads}$) formula $t_{ads}=A*B$.

6 Claims, 1 Drawing Sheet

(56) References Cited

U.S. PATENT DOCUMENTS

| | | | | |
|---|---|---|---|---|
| 2005/0045041 A1* | 3/2005 | Hechinger | ........... | B01D 53/047 |
| | | | | 96/121 |
| 2005/0283282 A1* | 12/2005 | Pervaiz | ............... | B01D 53/261 |
| | | | | 701/19 |
| 2009/0165643 A1* | 7/2009 | Huberland | ........... | B01D 53/261 |
| | | | | 96/112 |
| 2017/0095766 A1 | 4/2017 | Wright | | |
| 2017/0095767 A1* | 4/2017 | Miehe | .................. | B01D 53/261 |
| 2019/0105595 A1* | 4/2019 | Hermans | .............. | B01D 53/261 |

FOREIGN PATENT DOCUMENTS

| | | |
|---|---|---|
| RU | 2481145 C2 | 5/2013 |
| RU | 2534145 C1 | 11/2014 |
| WO | 2016032449 A1 | 3/2016 |

OTHER PUBLICATIONS

BE Search Report and Written Opinion in corresponding BE Application No. 202005000, dated Sep. 23, 2020.
Written Opinion of the International Preliminary Examining Authority in corresponding PCT Application No. PCT/IB2020/062471, dated Oct. 12, 2021.
International Preliminary Report on Patentability in corresponding PCT Application No. PCT/IB2020/062471, dated Apr. 25, 2022.
RU Search Report in corresponding RU Application No. 2022120710/04, dated Dec. 26, 2022.

* cited by examiner

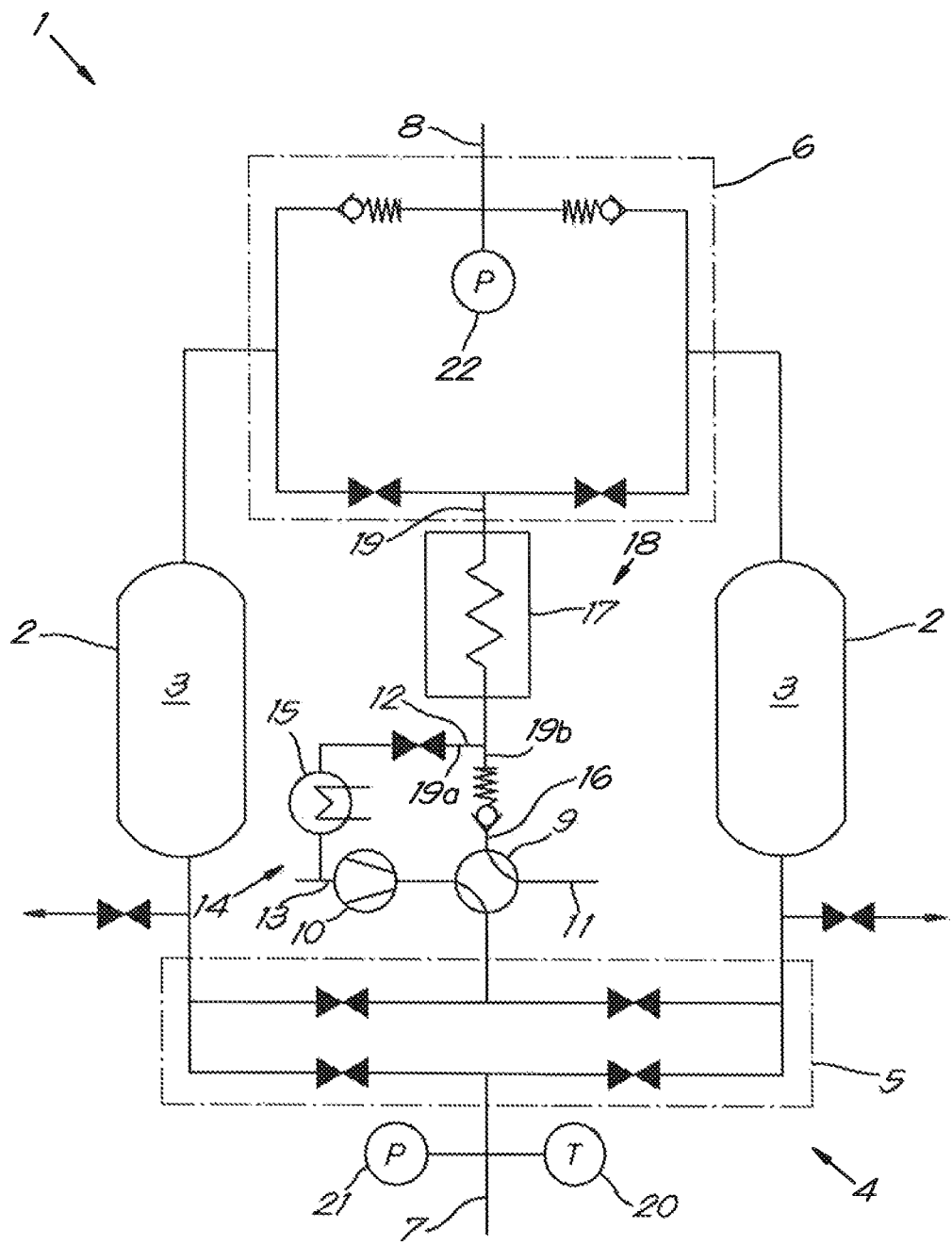

METHOD FOR DRYING COMPRESSED GAS

The current invention relates to a procedure for drying compressed gas.

BACKGROUND OF THE INVENTION

More specifically, the invention is intended for drying devices fitted with an inlet for compressed gas to be dried and an outlet for dried compressed gas, wherein the drying device includes at least two vessels filled with a regenerable desiccant and an adjustable valve system connecting the aforementioned inlet and outlet to the aforementioned vessels, wherein the adjustable valve system is regulated as such that at least one vessel will dry compressed gas, while the other vessel is successively regenerated and cooled, wherein, by regulation of the valve system, the vessels will each in turn dry compressed gas.

Regenerable desiccant means a moisture absorber or desiccant that can absorb moisture from a gas by adsorption and, when saturated with moisture, can be dried by transmitting a so-called regeneration gas through it. This process is also called regeneration of the desiccant. The regeneration gas is typically a hot gas.

Although this is the principle of adsorption, the invention can also be applied to the principle of absorption.

When a vessel will dry, it will absorb moisture from the compressed gas to be dried, saturating the desiccant.

This vessel is then regenerated, typically allowing warm air to pass through it. This warm air will extract moisture from the desiccant and regenerate it.

In known drying devices, the switchover of the vessels from drying to regeneration takes place, i.e. the determination of the time period during which a vessel dries or the length of the adsorption cycle, based on a dew point measurement.

The dew point at the outlet of the drying device shall be measured by means of a dew point sensor.

When the dew point rises above a certain threshold, this means that the desiccant in the relevant vessel drying the compressed gas is saturated.

At that moment the valve system will be controlled to allow another vessel to dry the compressed gas, while the vessel with saturated desiccant will be regenerated.

Such known drying devices therefore have the disadvantage that they are completely dependent on the measurements of the dew point sensor for the correct operation of the drying device.

However, a dew point sensor is a very sensitive sensor, which means that deviations in the measured dew point can very easily occur.

Moreover, such a sensor is very expensive and, because it is so fragile, needs to be replaced regularly.

SUMMARY OF THE INVENTION

The current invention aims to solve at least one of the aforementioned and other disadvantages, as it provides a procedure which will allow to determine the time period during which a vessel dries or the length of the adsorption cycle, without the need for a dew point sensor.

The current invention has a procedure as an object for drying compressed gas by means of a drying device with an inlet for compressed gas to be dried and an outlet for dried compressed gas, which drying device comprises at least two vessels filled with a regenerable desiccant and an adjustable valve system consisting of a first valve block and a second valve block containing which connects the aforementioned inlet, respectively outlet to the aforementioned vessels, wherein the adjustable valve system is being regulated as such that at least one vessel will dry compressed gas, while the other vessel is regenerated and cooled successively, wherein by regulation of the valve system the vessels will each in turn dry compressed gas, characterized in that the procedure consists of calculating the time period during which a vessel dries compressed gas, on the basis of a formula:

$$t_{ads} = A*B;$$

where:
$t_{ads}$=the time period during which a vessel dries compressed gas;
A=a predetermined adsorption time;
B=a product of one or more of the following factors:
  $C_{\Delta P}$=a correction factor for the average pressure drop over the drying device compared to a reference pressure drop over the drying device;
  $C_P$=a correction factor for the average inlet pressure compared to a reference inlet pressure;
  $C_T$=a correction factor for the average inlet temperature compared to a reference inlet temperature;
  C=a fixed correction factor;
wherein the reference pressure drop, reference inlet pressure and reference inlet temperature are the values measured or determined in the drying device when operating under reference conditions.

The aforementioned reference conditions depend on the drying device and are often the design parameters for which the drying device is designed.

The reference conditions are, for example, a certain pressure and temperature and with a full flow of the compressed gas to be dried. Under these conditions, the reference pressure drop, inlet pressure and temperature is then determined.

These values must only be determined once.

An advantage is that the procedure will allow the time period during which a vessel dries compressed gas to be calculated, i.e. the time at which this vessel must stop drying and the other vessel must be used to dry compressed gas is calculated.

This eliminates the need for a dew point sensor to determine when the vessel should stop drying and the other vessel should be used for drying.

Only a temperature sensor and pressure sensors will be needed, which are much more reliable and cheaper sensors.

BRIEF DESCRIPTION OF THE DRAWINGS

With a view to better demonstrating the characteristics of the invention, a number of preferred embodiments of a procedure based on the invention for drying a compressed gas are described below, as an example without any restrictive character, with reference to the accompanying drawings wherein:

FIG. 1 schematically depicts a drying device for drying a compressed gas by means of a procedure according to the invention.

DETAILED DESCRIPTION OF THE INVENTION

The drying device 1 schematically shown in FIG. 1 for the drying of compressed gas consists essentially of two vessels 2 filled with a moisture absorber 3.

This moisture absorber 3 is also called desiccant.

It is of course possible that there are more than two vessels 2.

The drying device 1 further comprises a valve system 4 consisting of a first valve block 5 and a second valve block 6.

The first valve block 5 will connect vessels 2 to an inlet 7 for dried compressed gas, while the second valve block 6 will connect vessels 2 to an outlet 8 for dried compressed gas.

The aforementioned valve blocks 5, 6 are a system of different pipes and valves which can be regulated in such a way that at any one time at least one vessel 2 is being regenerated, while the other vessel 2 or the other vessels 2 are drying the compressed gas, wherein by regulation of the valve system 4 the vessels 2 will each in turn dry compressed gas.

Furthermore, according to the invention, the drying device 1 is equipped with a four-way valve 9, a blower 10 for sucking in ambient air and a gas release port 11 for blowing off gas, which are configured in such a way that in a first position of the four-way valve 9 the blower 10 is connected to the vessels 2 via the first valve block 5, as shown in FIG. 1, and in a second position of the four-way valve 9 the gas release port 11 is connected to the vessels 2 via the first valve block 5.

As shown in FIG. 1, the drying device 1 is such that, in the first position of the four-way valve 9, the ambient air sucked in by the blower 10 can enter the vessel 2 which is being cooled via the four-way valve 9 and the first valve block 5.

Of course, the valve block 5 is regulated in the appropriate way to enable the right flow path for the gas.

In the example of FIG. 1, but not necessary for the invention, the drying device 1 is equipped with a cooling pipe 12 connecting the second valve block 6 to the inlet side 13 of the blower 10.

The figures show that a closed cooling circuit 14 will be formed when the four-way valve 9 is in the aforementioned first position, which is formed successively by the blower 10, the four way-valve 9, the first valve block 5, a vessel 2, the second valve block 6 and the cooling pipe 12.

As can be seen in the figures, the cooling pipe 12 contains a cooler 15. For example, this cooler 15 can be an air-to-air cooler 15.

The aforementioned closed cooling circuit 14 will be used to cool a vessel.

In addition, the drying device 1 is equipped with a regeneration pipe 16 which connects the four-way valve 9 to the second valve block 6.

In the second position of the four-way valve 9, when the four-way valve 9 connects gas release port 11 to the first valve block 5, the four-way valve 9 will connect blower 10 to the regeneration pipe 16 and thus to the second valve block 6.

This regeneration pipe 16 is equipped with a heater 17, in this case an electric heater 17.

Thus, in the second position of the four-way valve 9, a regeneration circuit 18 is formed comprising the blower 10, the four-way valve 9, the regeneration pipe 16 with the heater 17, the second valve block 6, the vessel 2 being regenerated, the first valve block 5, the four-way valve 9 and the gas release port 11.

Regeneration circuit 18 will be used to regenerate a vessel.

As can be seen in the figures, in this case the regeneration pipe 16 and the cooling pipe 12 partially coincide.

In this case, only one pipe 19 will leave from the second valve block 6, which also includes the aforementioned heating 20. The aforementioned pipe 19 splits into two separate pipes 19a, 19b, one of which leads to the inlet side 13 of the blower 10, in which the cooler 15 is included, and one to the four-way valve 9.

It goes without saying that, in addition to the appropriate regulation of valve blocks 5, 6 and the four-way valve 9, the aforementioned heating 17 and cooler 15 are also appropriately controlled when implementing the closed cooling circuit 14 and the regeneration circuit 18.

Finally, the drying device 1 in this case, but not necessary for the invention, includes a temperature sensor 20 to determine the inlet temperature $T_{in}$ and two pressure sensors 21 and 22 to determine the inlet pressure $P_{in}$, respectively the outlet pressure $P_{out}$.

It should be obvious that based on the measurements of the pressure sensors 21 and 22, the pressure drop $\Delta P$ over the drying device 1 can be determined by calculating the difference between the inlet pressure $P_{in}$ and the outlet pressure $P_{out}$.

The operation of the drying device 1 and the procedure according to the invention for drying compressed gas using the drying device 1 is very simple and as follows.

During the operation of the drying device 1 there will be compressed gas to be dried passing through the inlet 7 in the vessel 2 which is drying, this vessel 2 will hereafter be called vessel 2a.

When passing through this vessel 2a, the desiccant 3 will adsorb moisture and extract it from the gas.

The dried compressed gas will leave the drying device 1 through the outlet 8.

The other vessel 2, which has already dried gas during a previous cycle, contains moisture and is regenerated in the meantime. This vessel 2 will be called vessel 2b in what follows.

A regeneration cycle is used, which consists of heating ambient air and passing it through the vessel 2b and then blowing it off.

For this regeneration cycle, the aforementioned regeneration circuit 18 is used.

For this purpose, the four-way valve 9 is placed in the second position and the valve blocks 5, 6 are regulated in such a way that the regeneration circuit 18 is realized. The heating 17 is also switched on.

The blower 10 will suck in ambient air which passes through the regeneration pipe 16 along the heater 17 where the gas is heated.

Via the second valve block 6 the heated gas will be directed to the aforementioned vessel 2b, wherein when passing through this vessel 2b, it will extract moisture from the desiccant 3.

Via the first valve block 5, the hot, moist gas will leave the drying device 1 through the gas release port 11.

After the regeneration cycle, the heating 17 will be switched off.

When the desiccant 3 is regenerated, the vessel 2b will be cooled.

The closed cooling circuit 14 is used, wherein ambient air is sent through the vessel 2b that is being cooled.

The ambient air sucked in by the blower 10 will be circulated through the closed cooling circuit 14, after passing through the vessel 2b it will be cooled by the cooler 15. This cooled gas will then be sent through the vessel 2b again via the blower 10.

After completing the cooling of the vessel 2b, this vessel 2b can be used to dry compressed gas, while the other vessel 2a, previously used for drying, can now be regenerated and cooled.

If the vessel 2b still cools the vessel 2a after cooling, the vessel 2b will go into standby after cooling. This means that it does not dry, not regenerate or cool.

The moment of switchover, i.e. the moment at which the vessel 2a is started to regenerate, is determined by the procedure according to the invention.

According to the invention, the time span ($t_{ads}$) during which a vessel 2 dries compressed gas is calculated on the basis of a formula:

$$t_{ads}=A*B;$$

where:
- $t_{ads}$=the period of time during which a vessel 2 dries compressed gas;
- A=a predetermined adsorption time;
- B=a product of one or more of the following factors:
  - $C_{\Delta P}$=a correction factor for the average pressure drop $\Delta P_{gem}$ over the drying device 1 compared to a reference pressure drop $\Delta P_{ref}$ over the drying device 1;
  - $C_P$=a correction factor for the average inlet pressure $P_{gem}$ compared to a reference inlet pressure $P_{ref}$;
  - $C_T$=a correction factor for the average inlet temperature $T_{gem}$ compared to a reference inlet temperature $T_{ref}$;
  - C=a fixed correction factor.

In what follows it is assumed that $B=C_{\Delta P}*C_p*C_T*C$. But it is also possible that for example $B=C_{\Delta P}*C_p$ or $B=C_T$ or any other possible combination of 1 to 4 of these factors.

After the calculated time span $t_{ads}$ has elapsed, the vessels 2a, 2b will switch. This means: the vessel 2a will be regenerated, while the vessel 2b will dry gas.

The procedure described above will be repeated, but the function of the vessels 2a, 2b will be reversed.

As already mentioned, the reference pressure drop $\Delta P_{ref}$, reference inlet pressure $P_{ref}$ and reference inlet temperature $T_{ref}$ are the values of the pressure drop $\Delta P$ over the drying device 1, respectively inlet pressure $P_{in}$ and inlet temperature $T_{in}$ which are measured or determined in the drying device 1 when operating under reference conditions.

These reference conditions are a fixed value for the temperature, e.g. 35° C., for the pressure of the compressed gas, e.g. 7 bar, and at a full flow rate of the compressed gas to be dried.

When, under these reference conditions, the drying device 1 is operated, a pressure difference $\Delta P$ over the drying device 1, an inlet pressure $P_{in}$ and an inlet temperature $T_{in}$ will be determined which correspond to $\Delta P_{ref}$, $P_{ref}$ and $T_{ref}$.

These values for the reference pressure drop $\Delta P_{ref}$, reference inlet pressure $P_{ref}$ and reference inlet temperature $T_{ref}$ are fixed values.

Preferably, the parameter A from the aforementioned formula for $t_{ads}$ is equal to the adsorption time during which a vessel 2 can adsorb when the drying device 1 operates under reference conditions.

In other words, this parameter A is determined in the same way as the aforementioned reference values and is a fixed value.

Preferably the parameter C, the fixed correction factor, is equal to a number greater than zero and less than or equal to one. In practice, C will typically have a value of 0.8 to 0.9.

This is a safety factor to limit $t_{ads}$ so that a vessel 2 will never adsorb for too long but that the vessels 2 will be switched in time.

The other parameters $C_{\Delta P}$, $6C_p$, and $C_T$ are not fixed values, but are recalculated during each adsorption cycle to be able to calculate $t_{ads}$ for the next adsorption cycle.

Preferably the following formula is used for $C_{\Delta P}$:

$$C_{\Delta P}=\sqrt{\Delta Pref/\Delta Pgem};$$

where $\Delta P_{ref}$ is the reference pressure drop over the drying device 1 and $\Delta P_{gem}$ is the average pressure drop over the drying device 1 measured over a drying cycle.

Alternatively, it is also possible that $C_{\Delta P}$ is determined or measured using the measured or determined flow rate. For this purpose, a flow sensor can be used, for example. It is called $C_{flow}$, where:

$$C_{flow}=\text{Flow rate}_{ref}/\text{Flow rate}_{gem};$$

where Flow $\text{rate}_{ref}$ is the reference flow rate through the drying device 1 and Flow rategem is the measured flow rate through the drying device 1 during a drying cycle.

Another alternative is to determine or calculate $C_{\Delta P}$ based on the rpm of a compressor to which the drying device is connected.

Preferably, the following formula is used for $C_P$:

$$C_P=P_{gem}/P_{ref};$$

where $P_{ref}$ is the reference inlet pressure and $P_{gem}$ is the average inlet pressure measured over a drying cycle.

Preferably, the following formula is used for $C_T$:

$$C_T = \frac{\text{amount of moisture per } m^3 \text{ gas at } Tref}{\text{amount of moisture per } m^3 \text{ gas at } Tgem}$$

where $T_{ref}$ is the reference inlet temperature and $T_{gem}$ is the average inlet temperature measured over a drying cycle.

The amount of moisture per m³ gas at a certain temperature can be read from tables or curves known in the literature.

The average pressure drop $\Delta P_{gem}$, the average inlet pressure $P_{gem}$ and the average inlet temperature $T_{gem}$ can easily be determined from the measurements of the temperature sensor 20 to determine the inlet temperature $T_{in}$ and the two pressure sensors 21 and 22 to determine the inlet pressure $P_{in}$ and the outlet pressure $P_{out}$ respectively.

Using the aforementioned formula and based on the measurements of sensors 20, 21 and 22, $t_{ads}$ can be calculated for the next cycle after each adsorption cycle.

Preferably, the calculated time span $t_{ads}$ during which a vessel 2 dries compressed gas is equal to the so-called minimum half cycle time.

A complete cycle consists of regenerating the first vessel 2 and regenerating the second vessel 2.

So half a cycle is to regenerate one vessel 2. The half cycle time is the time needed to regenerate one vessel 2.

The half cycle time, i.e. the time during which at least one vessel 2 must be regenerated, is in principle also equal to the adsorption time or the time during which a vessel 2 will dry gas.

The calculated time span $t_{ads}$ is equal to the minimum half cycle time, i.e. the minimum adsorption time of a vessel 2.

This means that the adsorption time must be at least equal to the calculated time span $t_{ads}$.

It is possible to let the vessel 2 adsorb longer if a dew point sensor is present, for example if the dew point is still high enough after the expiration of the calculated time span $t_{ads}$.

Although the example shown and described above refers to two vessels 2, it is not excluded that there may be more than two vessels 2. There is always at least one vessel 2 that will dry compressed gas.

If there are two or more vessels 2 drying compressed gas at the same time, $t_{ads}$ will be valid for both vessels.

If the two vessels 2 do not start to dry compressed gas simultaneously, a $t_{ads}$ will be calculated for each of these vessels 2.

The current invention is by no means limited to the embodiments by way of example and shown in the figures, but such a procedure can be carried out in different variants without going beyond the scope of the invention.

The invention claimed is:

1. A method for drying compressed gas by means of a drying device with an inlet for the compressed gas to be dried and an outlet for the dried compressed gas, wherein the drying device comprises at least two vessels filled with a regenerable desiccant and an adjustable valve system comprising a first valve block and a second valve block that connects the inlet and the outlet to the vessels, wherein the method comprises inputting compressed gas to the at least two vessels via the adjustable valve system;

regulating the adjustable valve system such that at least one vessel dries the compressed gas while the other vessel is regenerated and cooled successively, wherein by regulation of the valve system the vessels each in turn dry the compressed gas, and wherein the step of regulating the adjustable valve system comprises steps of:

(i) calculating the time period ($t_{ads}$) during which a vessel dries the compressed gas, without input from a dew point sensor, on the basis of a formula:

$$t_{ads} = A*B;$$

where:
  $t_{ads}$=the period of time during which a vessel dries compressed gas;
  A=a predetermined adsorption time;
  B=a product of one or more of the following factors:
  $C_{\Delta P}$=a correction factor for correcting the predetermined absorption time based on a comparison between the average pressure drop ($\Delta P_{gem}$) over the drying device and a reference pressure drop ($\Delta P_{ref}$) over the drying device;
  $C_P$=a correction factor for correcting the predetermined absorption time based on a comparison between the average inlet pressure ($P_{gem}$) and a reference inlet pressure ($P_{ref}$);
  $C_T$=a correction factor for correcting the predetermined absorption time based on a comparison between the average inlet temperature ($T_{gem}$) and a reference inlet temperature ($T_{ref}$);
  C=a fixed correction factor;

where the reference pressure drop ($\Delta P_{ref}$), reference inlet pressure ($P_{ref}$) and reference inlet temperature ($T_{ref}$) are the values measured or determined in the drying device when operating under reference conditions, where B comprises at least the factor $C_P$;

(ii) controlling the first and second valve blocks to input the compressed gas to a first of the at least two vessels, for the calculated time period, and thereby dry the compressed gas in the first of the at least two vessels;

(iii) controlling the first and second valve blocks to prevent input of the compressed gas to a second of the at least two vessels during the calculated time period, and allow the dessicant in the second of the at least two vessels to regenerate.

2. The method according to claim 1 wherein for Cop the following formula is used:

$$C_{\Delta P} = \sqrt{\Delta Pref/\Delta Pgem};$$

where $\Delta P_{ref}$ is the reference pressure drop ($\Delta P_{ref}$) over the drying device and $\Delta P_{gem}$ is the average pressure drop ($\Delta P_{gem}$) over the drying device measured over a drying cycle or CAP is determined or measured using the measured or determined flow rate, wherein:

$$C_{flow} = \text{Flow rate}_{ref}/\text{Flow rate}_{gem};$$

where Flow rate$_{ref}$ is the reference flow rate through the drying device and Flow rate$_{gem}$ is the measured flow rate through the drying device measured over a drying cycle or $C_{\Delta P}$ is determined or calculated from the rpm of a compressor to which the drying device is connected.

3. The method according to claim 1, wherein for $C_P$ the following formula is used:

$$C_P = P_{gem}/P_{ref};$$

where $P_{ref}$ is the reference inlet pressure ($P_{ref}$) and $P_{gem}$ is the average inlet pressure ($P_{gem}$) measured over a drying cycle.

4. The method according to claim 1, wherein for $C_T$ the following formula is used:

$$C_T = \frac{\text{amount of moisture per } m^3 \text{ gas at } Tref}{\text{amount of moisture per } m^3 \text{ gas at } Tgem}$$

where $T_{ref}$ is the reference inlet temperature ($T_{ref}$) and $T_{gem}$ is the average inlet temperature ($T_{gem}$) measured during a drying cycle.

5. The method according to claim 1, wherein A is equal to the time during which a vessel can adsorb when the drying device operates under reference conditions.

6. The method according to claim 1, wherein C is greater than zero and less than or equal to 1.

* * * * *